(12) United States Patent
Zhang

(10) Patent No.: US 9,172,966 B2
(45) Date of Patent: Oct. 27, 2015

(54) SYSTEM AND METHOD FOR ADAPTIVE CODING TREE MODE DECISION

(71) Applicant: Broadcom Corporation, Irvine, CA (US)

(72) Inventor: Lei Zhang, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 283 days.

(21) Appl. No.: 13/905,692

(22) Filed: May 30, 2013

(65) Prior Publication Data

US 2014/0334533 A1    Nov. 13, 2014

Related U.S. Application Data

(60) Provisional application No. 61/822,506, filed on May 13, 2013.

(51) Int. Cl.
*H04N 19/18* (2014.01)
*H04N 19/176* (2014.01)
*H04N 19/119* (2014.01)
*H04N 19/156* (2014.01)

(52) U.S. Cl.
CPC .......... *H04N 19/176* (2014.11); *H04N 19/119* (2014.11); *H04N 19/156* (2014.11)

(58) Field of Classification Search
None
See application file for complete search history.

(56) References Cited

U.S. PATENT DOCUMENTS

2011/0032988 A1*   2/2011   Chiba et al. .............. 375/240.12

* cited by examiner

*Primary Examiner* — Jeremaiah C Hallenbeck-Huber
*Assistant Examiner* — Nam Pham
(74) *Attorney, Agent, or Firm* — Brinks Gilson & Lione

(57) ABSTRACT

A system and method for encoding video is provided. The system may partition a video frame into multiple coding units. The system may determine a memory bandwidth budget and selectively code each coding unit based on a memory cost as compared to the memory bandwidth budget.

20 Claims, 6 Drawing Sheets

SYSTEM AND METHOD FOR ADAPTIVE CODING TREE MODE DECISION

CROSS REFERENCE TO RELATED APPLICATIONS

This application is a non-provisional of and claims the benefit of U.S. Provisional Patent Application No. 61/822,506 filed May 13, 2013, entitled "System And Method For Adaptive Coding Tree Mode Decision" the content of which is hereby incorporated by reference in its entirety.

TECHNICAL FIELD

This disclosure relates generally to a method and system for video processing.

BACKGROUND

The recent surge of streaming video services promoting the delivery of high resolution video has generated increased demand on communication networks. The increased demand may be caused in part by innovations in mobile devices capable of playing high resolution video. Modern video encoding may provide for increased efficiency to limit the bandwidth required to deliver the data associated with the streaming video, but also introduces increased requirements for encoding video. The demand on systems to encode video data and other associated content is increasing as a result of the advances in encoding.

In order to provide encoded video via advanced coding methods, systems must also improve to accommodate the increasing demand of modern video coding standards. Improvements in encoding systems may provide for advanced capability while maintaining competitive cost. Accordingly, systems and methods for improved efficiency in video coding may be beneficial to continue to support advanced video applications and standards.

DETAILED DESCRIPTION

Figure 1:
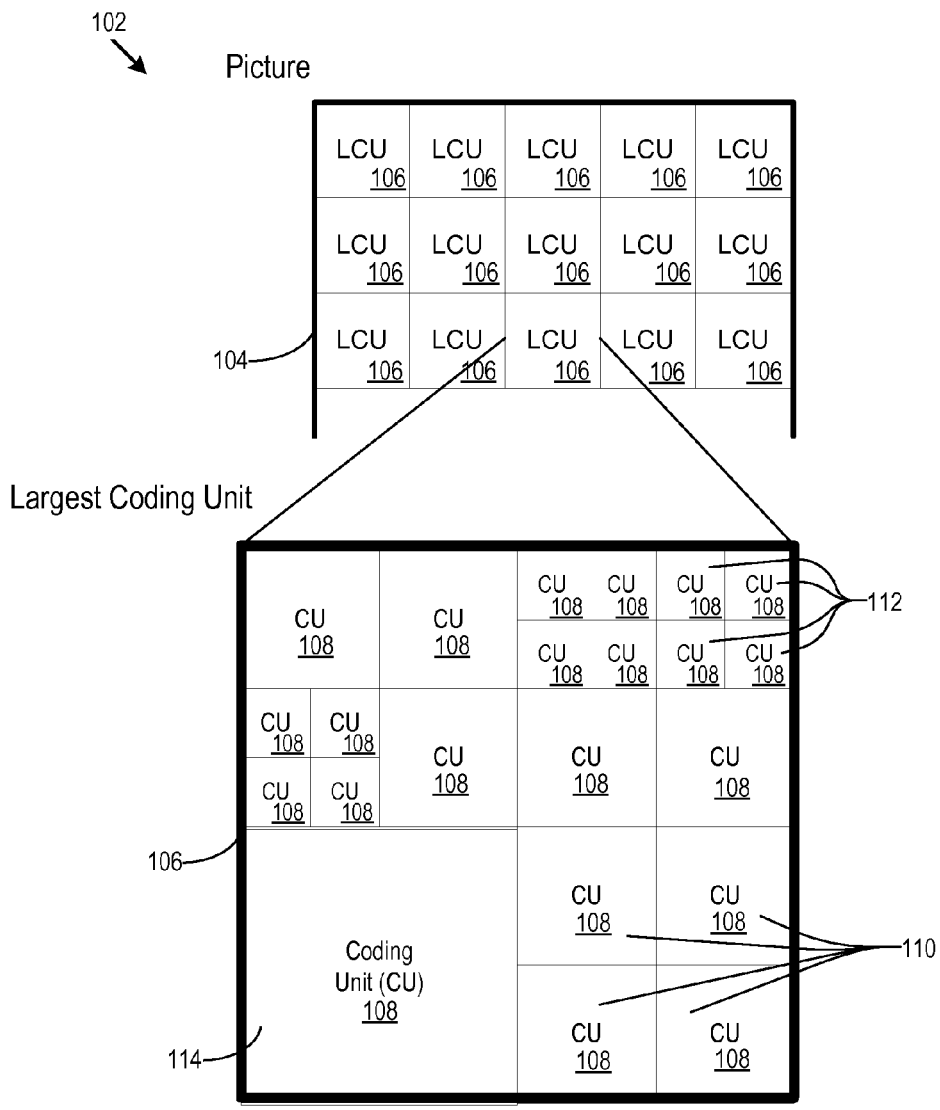
FIG. 1 shows an example of a partitioned image demonstrating a coding tree structure.

Modern encoding methods may provide for improved efficiency due to the introduction of new coding tools. Quadtree based partitioning is one improvement that may provide for enhanced compression in encoding. FIG. 1 shows an example of a partitioned image 102 demonstrating a Quadtree structure. Quadtree partitioning may divide an image 102 into a plurality of block-shaped regions. At a first level of partitioning, each block shaped region may define a largest coding unit (LCU) 106. LCUs 106 may also be commonly referred to coding tree units. The partitioning of each block may be stored in reference data corresponding to each image.

Each LCU may further be divided into smaller coding units (CU) 108. In quadtree structure, each LCU 106 may be subdivided into multiple units, for example four CUs 110. Each unit may further be subdivided into four more CUs 112. In one example, each CU may range in size from 4×4 pixels to 64×64 pixels. In another example, each CU may range from 2×2 pixels to 256×256 pixels. The size of each CU may vary based on a particular coding standard or application. Though quadtree structure is discussed in this disclosure, the disclosed methods and systems may be applied to other partitioning regimes for video encoding.

An encoding method may incorporate interpicture and intrapicture prediction with quadtree partitioning. In general, an intrapicture prediction mode may be applied for a first image of a sequence of images (e.g. video sequence) to be encoded. Intrapicture encoding may be applied to compress an image by scanning each of the LCUs 106 and CUs 108 of an image 104, and determining spatial similarities among the LCUs 106 and CUs 108 within the image. These special similarities may then be compressed to generate a coded image. Generally, intrapicture prediction may also be applied for the first image of a new video scene.

After the first image of a video sequence has been coded in intrapicture prediction mode, a following image may be encoded in an interpicture prediction mode. Interpicture encoding may comprise scanning each LCU 106 and CU 108 to detect motion data among sequential images of a video sequence. For example, the first image encoded in the intrapicture mode may be used as a reference to detect motion data in a second image. A CU 108 of the first encoded image may be referenced and a motion vector may be calculated corresponding to motion of a similar CU 108 in the second image. By referencing the CUs 108 from the first image to the second image and so on, significant compression may be possible. Compression among the images of a video sequence may provide for significantly less data to be required to transport a coded video stream.

Quadtree partitioning may provide for improved compression, but may further cause increased traffic in memory bandwidth. For example, an LCU 106 with many small CUs 112 may require an encoder to fetch a number of reference pixels for each CU 108 from memory. An encoder may make requests to fetch reference pixels in an interpicture mode to perform motion estimation and motion compensation. The increased fetching of reference pixels may further require more memory bandwidth. In another example, an LCU 106 may comprise a smaller number of larger CUs 114. In this case, the encoder may make fewer requests to access the reference pixels from memory. In this example, fewer requests may require less memory bandwidth. In an intrapicture mode of encoding, an encoder may not require any significant memory bandwidth because the reference pixels may be within the image being encoded.

The previous examples may illustrate that the number of CUs 108 and the corresponding size of each CU 108 may have a significant effect on the memory bandwidth required to encode an image in interpicture mode. If there is insufficient memory bandwidth, errors in encoding may occur. When the memory bandwidth cannot sustain the real-time performance required for interpicture encoding, an encoder may skip images in a video sequence. Skipping may generate jitter (e.g. apparent variation in video frame rate) when playing back the encoded video.

The increased bandwidth required to encode a video sequence in interpicture mode may correspond to a significant expense. Providing additional memory bandwidth may require costly bandwidth increases in encoders leading to increased production cost. Memory as referred to herein may generally refer to any memory capable of storing digital information, and in some examples, may refer to random access memory (RAM) and dynamic random access memory (DRAM). Though the term encoder was discussed in the previous example, any processor or circuit operable to process data similar to the disclosed methods may be similarly utilized without departing from the spirit of this disclosure. The term CU may be used generally to describe an LCU or a CU. The LCUs designating the largest coding blocks of an image and the CUs designating any coding unit.

Figure 2:
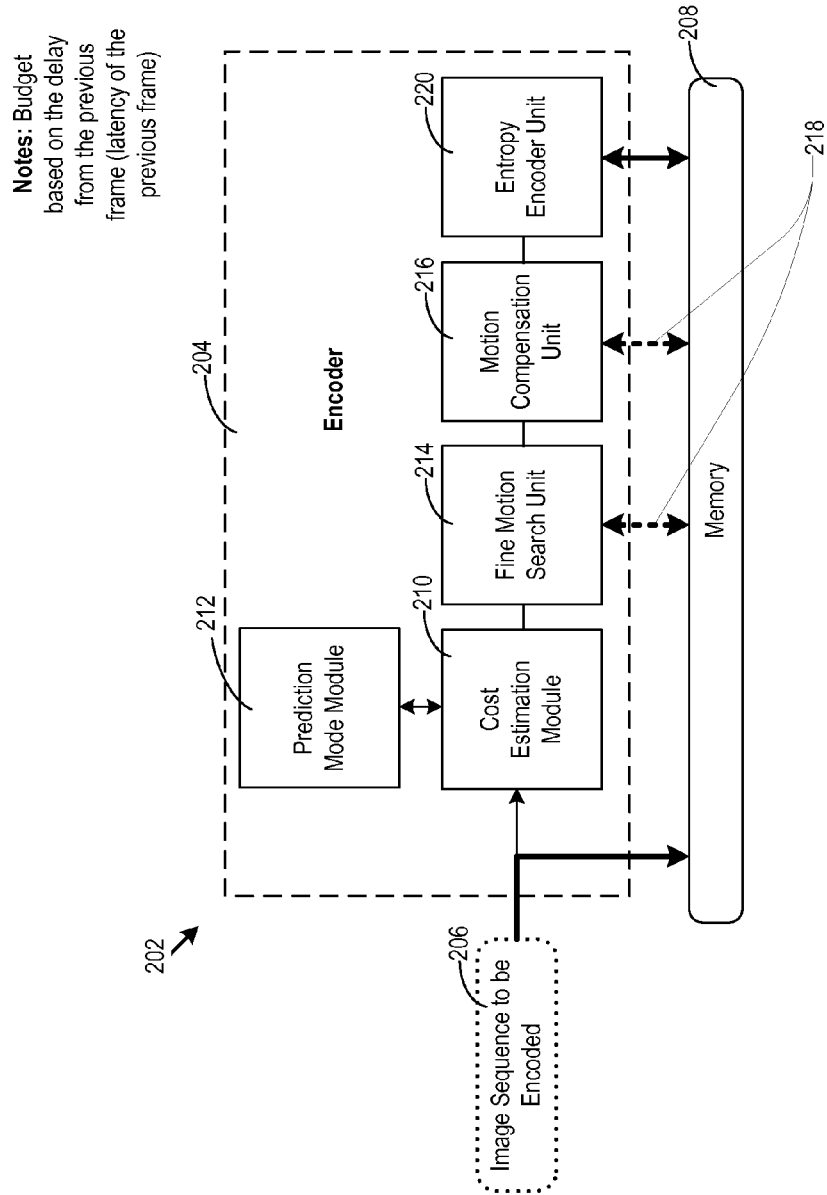
FIG. 2 is an example of a system for video encoding operable to determine a coding operation based on a memory bandwidth.

FIG. 2 is an example of a system 202 for video encoding operable to determine a coding tree decision based on a memory bandwidth. A coding tree decision may comprise applying interpicture prediction or interpicture prediction for a CU. An encoder 204 may be operable to receive a sequence of images 206 and store the sequence of images in memory 208, such as DRAM. After a first image is coded in intrapicture mode, a second image in the sequence of images may be encoded in interpicture mode or intrapicture mode. The encoder 204 may comprise a cost estimation module 210. The cost estimation module and other disclosed modules and units may define one module of a plurality of modules operable to encode a video sequence. The cost estimation module may also define a task or routine of at least one module configured to encode a sequence of images.

Prior to encoding the second image, the cost estimation module 210 may sample raw reference pixels for a CU of the second image. The raw reference pixels and the number of CUs may be applied to calculate a cost in terms of memory bandwidth required to encode the CU in interpicture mode. The cost may also be based on the number of CUs or the raw reference pixels independently to determine an approximate memory cost. The cost estimation module 210 may then compare the cost of encoding the CU in interpicture mode with a memory bandwidth budget. The cost estimation module may further supply information to a prediction mode module 212. The prediction mode module 212 may apply the memory bandwidth cost and memory bandwidth budget comparison to determine a coding tree decision.

The memory cost may be a timing cost. The timing cost may relate to latency in a memory request. For example, latency in a memory request may refer to an increased time in a response to the memory request and may also refer to a response not being received within an allotted time. The timing cost may be expressed in terms of retrieval time, bandwidth used, or other similar metrics. Once the memory cost has been calculated, the cost in terms of memory bandwidth required to encode a CU in interpicture mode may be compared to the memory bandwidth budget. This comparison may then be used to determine if the CU will be coded in an interpicture mode or an intrapicture mode.

If the cost of encoding the CU in interpicture mode exceeds the memory bandwidth budget, the prediction mode module 212 may assign the CU to be encoded in intrapicture mode. Encoding the CU in intrapicture mode may ensure that the memory bandwidth budget is not exceeded. If the cost does not exceed the memory bandwidth budget, the prediction mode module 212 may assign the CU to be encoded in interpicture mode. Selectively applying the intrapicture mode or the interpicture mode to each CU may prevent delays and errors in encode the sequence of images 206.

The memory budget may further comprise an allocated memory bandwidth budget. During different periods of operation, the memory 208 may experience increased requests to fetch or retrieve data for the encoder or other electronic components. Electronic components may comprise a wide range of components in communication with the memory, for example processors, integrated circuits, decoders, etc. Based on the operations of the other electronic components accessing the memory, the allocated memory bandwidth budget available for the encoder 204 may be adjusted to maintain the performance of the encoder 204 and other electronic components.

In one example, the allocated memory bandwidth budget may be increased due to limited activity by other electrical components. In this case, the prediction mode module 212 may designate a full or partial LCU or a plurality of consecutive LCUs for encoding in interpicture mode. The prediction mode module 212 may compare the estimated total memory bandwidth cost to the allocated memory bandwidth budget and limit the number of CUs coded in interpicture mode. When the cost approaches the allocated memory bandwidth budget calculated by the cost estimation module 210, the prediction mode module 212 may change the prediction mode to intrapicture prediction.

The cost estimate module 210 may also apply a Lagrange multiplier to estimate the cost of encoding one or more CUs or LCUs in interpicture mode. The Lagrange multiplier may introduce an additional cost parameter, Lambda. The additional cost parameter may provide for an improved estimation of the memory cost. The improved estimation may be calculated by approximating a maximum bandwidth cost of applying the interpicture mode of encoding to one or more CUs.

The prediction mode module 212 may further be configured to control other encoding modules related to interpicture and intrapicture encoding. If a CU is designated by the prediction mode module 212 for interpicture mode encoding, a fine motion search unit 214 and a motion compensation unit 216 may process at least one CU in interpicture mode. The fine motion search unit 214 and the motion compensation unit 216 may access 218 the memory 208 to fetch reference pixels. As discussed, this may cause a significant increase in the memory bandwidth cost. If a CU is designated by the prediction mode module 212 for intrapicture mode encoding, the fine motion search unit 214 and the motion compensation unit 214 may not require access 218 to the memory 208 to complete intrapicture encoding.

Upon completion of interpicture or intrapicture encoding of each CU, the encoder may continue to compress each CU of an image in an entropy encoder unit 220. An example of entropy encoding may comprise context-adaptive binary arithmetic coding (CABAC). Other entropy encoding examples may include a variety of lossless or lossy video encoding methods. The system 202 may selectively encode each CU in the interpicture mode or the intrapicture mode. By selecting the coding tree mode for each CU based on the memory bandwidth cost of interpicture prediction, the system 202 may efficiently implement available memory bandwidth.

The modules and units 210-216 and 220 and other similar modules and units referred to herein may comprise at least one module of an encoder, processor, or circuit. The modules and circuits may comprise programmable circuitry, integrated circuits, logic, and software that may be operable to process one or more of the disclosed techniques and methods. Variations of the disclosed implementations are contemplated by this disclosure.

Figure 3:
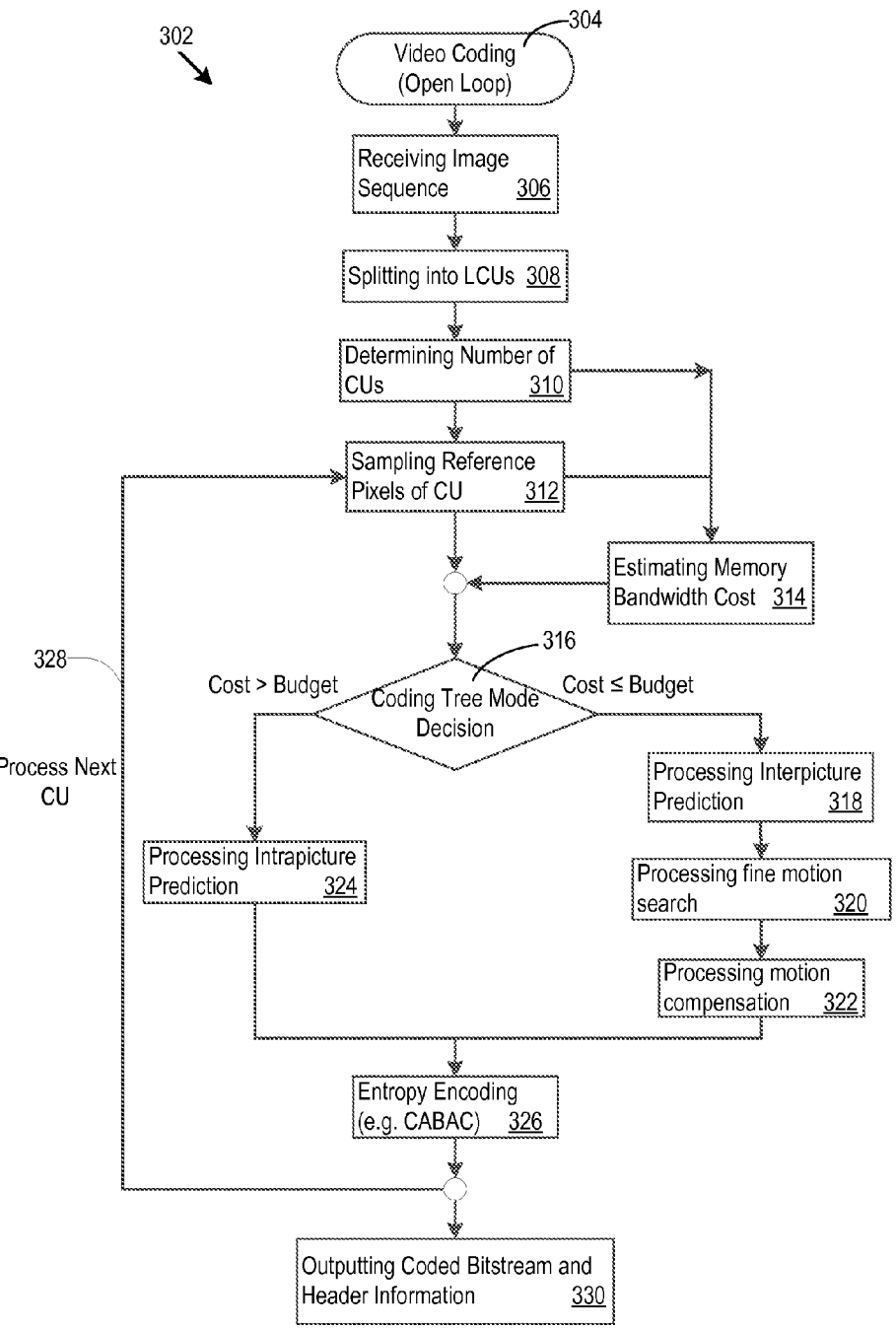
FIG. 3 is an example of a method for video encoding operable to determine a coding operation based on a memory bandwidth.

FIG. 3 is an example of a method 302 for video encoding operable to determine a coding operation based on a memory bandwidth. The method 302 for video encoding may generally comprise an open loop method 304. The method may begin by receiving a sequence of images (306). The sequence of images may define a live video sequence from a recording device. The sequence of images may also define a previously recorded or generated video sequence stored in memory or storage media. A processor, such as an encoder, may then split a first image into a plurality of LCUs based on an encoder algorithm (308). Each LCU may further be subdivided into a plurality of CUs. The number of CUs for the first image may then be determined (310).

A first CU may next be selected for encoding. From the first CU, a plurality of raw reference pixels may be sampled (312). The raw reference pixels may comprise, for example non-reconstructed reference pixels, such as down-sampled input raw pixels from the video sequence. The raw reference pixels and the number of CUs corresponding to an LCU may then be applied in an algorithm to estimate a cost of encoding one or more CUs in interpicture mode (314). The memory bandwidth cost may then be applied in a coding tree decision (316). In the coding tree decision, the memory bandwidth cost may be compared to a memory bandwidth budget. The memory bandwidth budget may define an allocated memory bandwidth budget.

If the cost of interpicture encoding is less than the memory bandwidth budget, the first CU may be encoded in an interpicture mode (318). The method may then continue to search the first CU through a fine motion search (320). The fine motion search may identify motion in the first CU by accessing memory and comparing the first CU to a similar CU from a prior or future image. If a similar CU is identified by the fine motion search, motion compensation may be processed for the CU (322). During motion compensation, a motion vector may be assigned and the first CU may be linked to the prior or future image through reference data. The reference data, for example, may comprise header information, compression data, files, matrices and other associated reference files.

If the cost of interpicture encoding is greater than the memory bandwidth budget, the first CUs may be encoded in an intrapicture mode (324). The intrapicture mode may compare the CUs of the current image to determine CUs for compression, but generally may not generate a cost related to the memory bandwidth. By selectively applying interpicture and intrapicture prediction for each CU, a cost of memory bandwidth may be controlled.

Once the coding tree mode decision and related processes are completed, a coded CU may be compressed further through an entropy encoding operation (e.g. CABAC) (326). The method 302 may continue to process the next CU after completing the entropy encoding (328). The method may also begin processing another CU or group of CUs during steps 318-326. For example, the method may function as a video pipeline for encoding a video sequence for increased throughput of CUs and corresponding images. As the encoding process is completed, a coded bit stream of the original video sequence may be output including the reference data for video playback (330).

Figure 4:
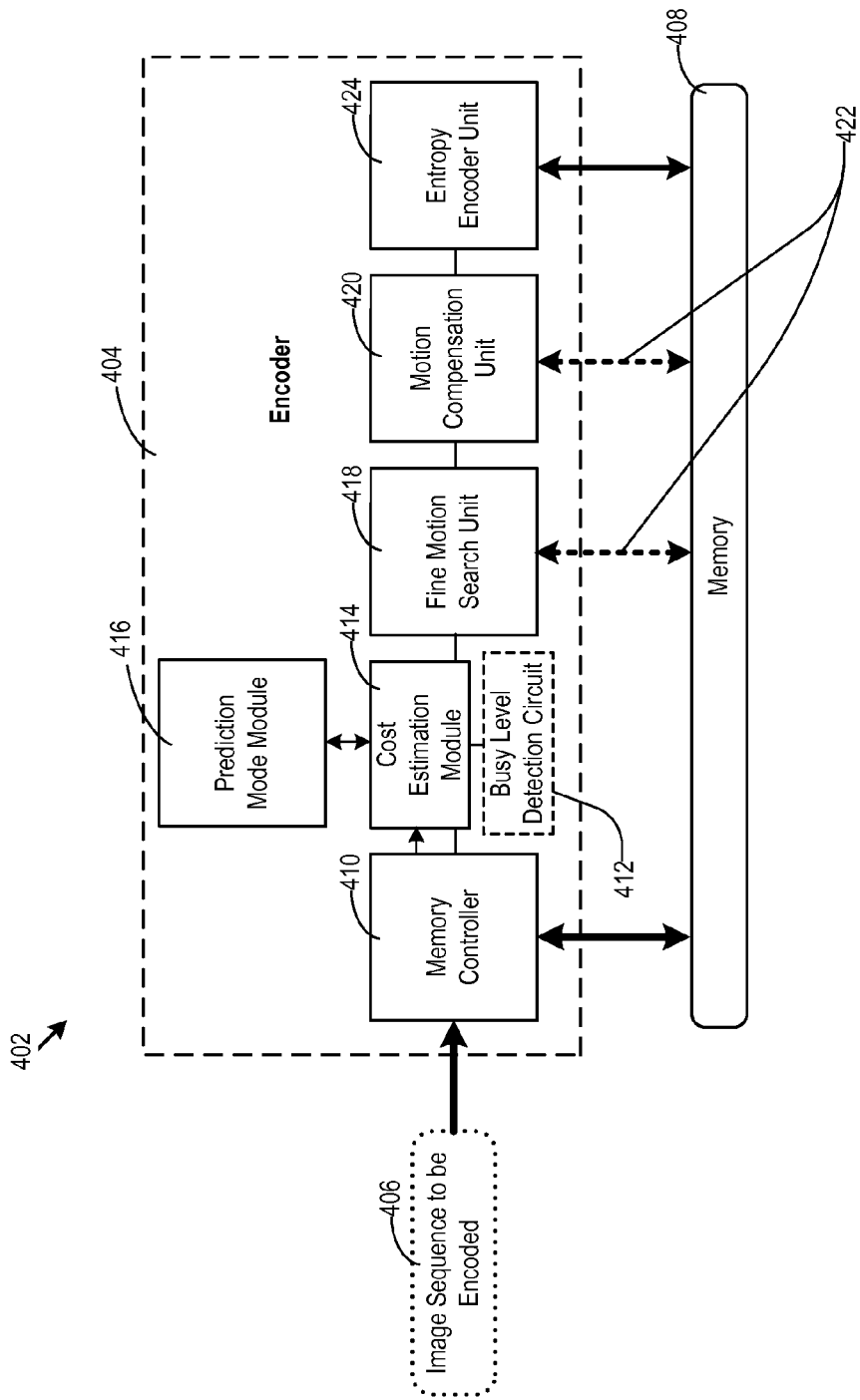
FIG. 4 is an example of a system for video encoding operable to determine a coding operation based on a memory bandwidth through a feedback signal.

FIG. 4 is an example of a system 402 for video encoding operable to determine a coding operation based on a memory bandwidth through a feedback signal. The system 402 may provide for efficient usage of memory bandwidth by controlling encoding operations through a memory bandwidth budget. An encoder 404 may be operable to receive a sequence of images 406 and store the sequence of images in memory 408, such as DRAM. The encoder 404 may comprise a memory controller 410, for example a DRAM controller.

The memory controller 410 may be configured to read and write data associated with the sequence of images to memory 408. The memory controller 410 may further be operable to monitor the real-time memory bandwidth of the memory 408 through a feedback signal. The feedback signal from the memory may be implemented to update the real-time memory bandwidth budget to ensure an available bandwidth is not exceeded. In some implementations, a feedback signal corresponding to the real-time memory bandwidth may also be monitored by a busy level detection circuit 412.

The busy level detection circuit 412 may be configured to monitor the memory bandwidth by detecting latency in a memory request. The busy level detection circuit 412 may detect latency through a module in the encoder that contains a memory monitor. When a client submits a memory request, the latency of fulfilling the request may be monitored by the busy level detection circuit 412 to determine a memory busy level. A client may comprise any electrical device in communication with the memory, for example the encoder 402, a processor, a circuit, a decoder or other electrical devices. The feedback signals discussed may be similarly supplied by at least one of the memory controller 410 and the busy level detection circuit 412. The feedback signals may provide information including different memory busy levels to generate a real-time memory bandwidth budget.

The encoder 404 may further comprise a cost estimation module 414. The cost estimation module 414 may sample raw reference pixels for each CU of the sequence of images to be encoded 406. The reference pixels and the number of CUs may be applied to calculate a cost in terms of the memory bandwidth required to encode at least one CU in interpicture mode. The cost estimation module 414 may then compare cost of encoding at least one CU in interpicture mode with the real-time memory bandwidth budget. The cost estimation module may further supply information to a prediction mode module 418. The prediction mode module 418 may apply the memory bandwidth cost and memory bandwidth budget comparison to determine a coding tree decision.

If the cost of encoding a CU in interpicture mode exceeds the real-time memory bandwidth budget, the prediction mode module 416 may assign the CU to be encoded in intrapicture mode. Encoding the CU in intrapicture mode may ensure that the memory bandwidth budget is not exceeded. If the cost does not exceed the real-time memory bandwidth budget, the prediction mode module 416 may assign the CU to be encoded in interpicture mode. Selectively applying the intrapicture mode or the interpicture mode to each CU may prevent delays and errors in encode the sequence of images 406.

The prediction mode module 416 may further be configured to control other encoding modules related to interpicture and intrapicture encoding. If a CU is designated by the prediction mode module 416 for interpicture mode encoding, a fine motion search unit 418 and a motion compensation unit 420 may process at least one CU in interpicture mode. The fine motion search unit 418 and the motion compensation unit 420 may access 422 the memory 408 to fetch reference pixels. If a CU is designated by the prediction mode module 416 for intrapicture mode encoding, the fine motion search unit 418 and the motion compensation unit 420 may not require access 422 to the memory 408 to complete intrapicture encoding.

Upon completion of interpicture or intrapicture encoding of each CU, the encoder may continue to compress each CU of an image in an entropy encoder unit 424. The system 402 may selectively encode each CU in the interpicture mode or the intrapicture mode. By selecting the coding tree mode for each CU based on the memory bandwidth cost of interpicture prediction, the system 402 may efficiently implement available memory bandwidth.

Figure 5:
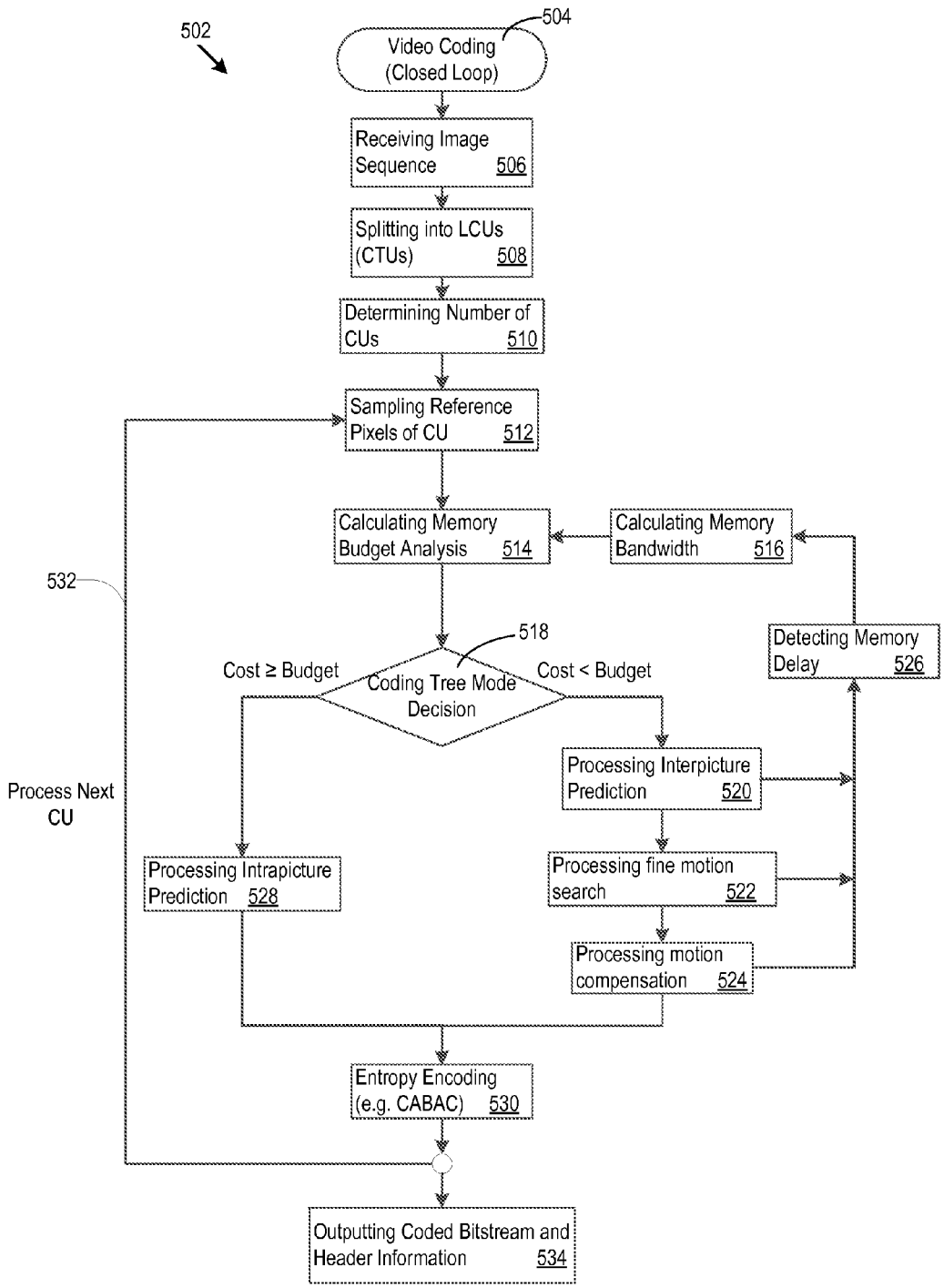
FIG. 5 is an example of a method for video encoding operable to determine a coding operation based on latency in memory.

FIG. 5 is an example of a method 502 for video encoding operable to determine a coding operation based on latency in memory. The method 502 for video encoding may generally comprise a closed loop method 504. The method may begin by receiving a sequence of images (506). The sequence of images may define a live video sequence from a recording device. The sequence of images may also define a previously recorded or generated video sequence stored in memory or storage media. A processor, such as an encoder, may then split a first image into a plurality of LCUs based on an encoder algorithm (508). Each LCU may further be subdivided into a plurality of CUs. The number of CUs for the first image may then be determined (510).

At least one CU may next be selected for encoding. From the at least one CU, a plurality of raw reference pixels may be sampled (512). The raw reference pixels and the number of CUs corresponding to an LCU may then be applied in an algorithm to estimate a cost of encoding at least one CU in interpicture mode through a memory budget analysis (514). In this implementation, a real-time memory bandwidth budget may be supplied by a feedback signal. The feedback signal may supply information related latency in a memory request to calculate the real-time memory bandwidth budget (516). The memory bandwidth cost and the real-time memory bandwidth budget may then be applied in a coding tree decision (518). In the coding tree decision, the memory bandwidth cost may be compared to a real-time memory bandwidth budget to determine a coding tree mode for the at least one CU.

If the cost of interpicture encoding is less than the real-time memory bandwidth budget, the at least one CU may be encoded in an interpicture mode (520). The method may then continue to search the at least one CU through a fine motion search (522). The fine motion search may identify motion in a CU by accessing memory and comparing the CU to a similar CU from a prior or future image. If a similar CU is identified by the fine motion search, motion compensation may be processed for the CU (524). During motion compensation a motion vector may be assigned and the CU may be linked to the prior or future image through reference data.

Each of the steps 520-524 may require an encoder to access memory to retrieve reference pixel data. If the memory bandwidth cost begins to exceed the memory bandwidth budget, a busy level detection circuit may detect latency in a memory request. When a client (e.g. 520-524) submits a memory request, the latency of fulfilling the request may be monitored by the busy level detection circuit to determine a memory busy level (526). In this implementation, the busy level detection circuit may detect latency in a request as the memory bandwidth cost approaches the memory bandwidth budget or exceeds the memory bandwidth budget.

In the event that the memory bandwidth budget is exceeded, encoding operations may not be significantly impeded. A significant delay in encoding may be prevented by the busy level detection circuit prior to the memory delay being apparent in the coded video stream. The effects of a minor delay detected by the busy level detection circuit may be corrected by changing the coding tree mode 518 to intrapicture prediction for at least one future CU. The real-time correction of this implementation may prevent visible defects in a coded video stream by detecting and correcting latency delays. If the memory bandwidth cost of interpicture encoding is greater than the real-time memory bandwidth budget, the at least one CU may be encoded in an intrapicture mode (528).

Once the coding tree mode decision and related processes are completed, coded CUs defining a compressed sequence of images may be compressed further through an entropy encoding operation (e.g. CABAC) (530). The method 502 may then continue to process the next CU 532 after completing the entropy encoding. The method may also begin processing another CU or group of CUs during steps 520-530. That is, the method may function as a video pipeline for encoding a video sequence for increased throughput of CUs and corresponding images. As the encoding process is completed, a coded bit stream of the original video sequence may be output including the reference data for video playback (534).

Figure 6:
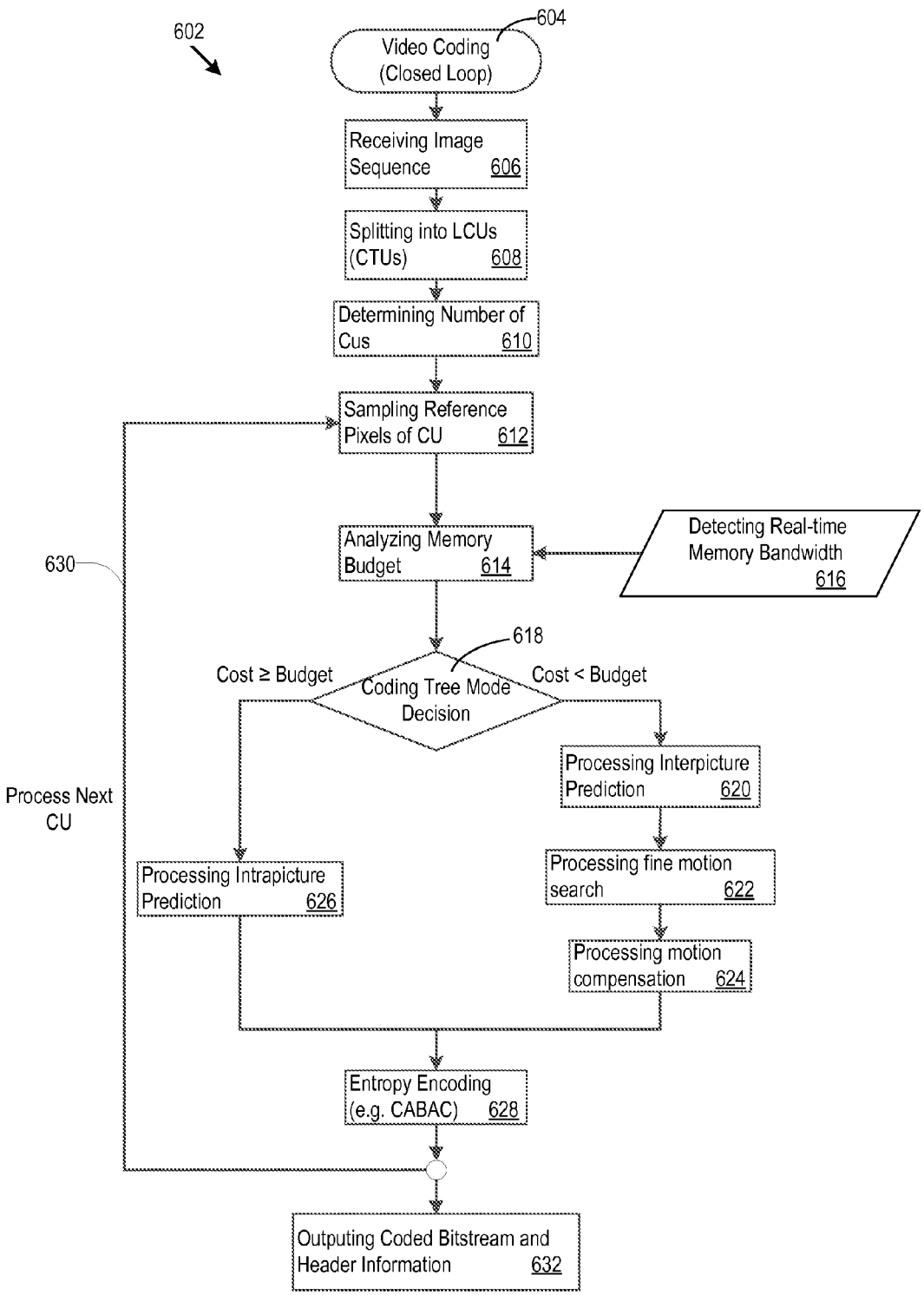
FIG. 6 is an example of a method for video encoding operable to determine a coding operation based on memory bandwidth.

FIG. 6 is an example of a method 602 for video encoding operable to determine a coding operation based on memory bandwidth. The method may begin by receiving a sequence of images (606). A processor, such as an encoder, may then split a first image into a plurality of LCUs based on an encoder algorithm (608). Each LCU may further be subdivided into a plurality of CUs. The number of CUs for the first image may then be determined (610).

At least one CU may next be selected for encoding. From the at least one CU, a plurality of raw reference pixels may be sampled (612). The raw reference pixels and the number of CUs corresponding to an LCU may then be applied in an algorithm to estimate a cost of encoding at least one CU in interpicture mode through a memory budget analysis (614). In this implementation, a real-time memory bandwidth budget may be supplied by a feedback signal. The feedback signal may be supplied by a memory controller, such as a DRAM controller. The memory controller may be configured to monitor a real-time memory bandwidth (616).

The memory controller in this implementation may be configured to manage requests from memory. By managing memory requests from one or more clients, the memory controller may limit periods of decreased memory bandwidth. A client may comprise any electrical device in communication with the memory, for example an encoder, a processor, a circuit, a decoder or other electrical devices. The memory controller may also be configured to monitor memory requests to determine a real-time memory bandwidth budget. Whether the memory controller is controlling memory requests or monitoring memory requests, the memory controller may provide a real-time memory bandwidth budget to compare to the estimated cost of encoding in interpicture mode.

Next, the real-time memory bandwidth budget may be compared to the memory bandwidth cost for at least one CU in a coding tree decision (618). If the cost of interpicture encoding is less than the real-time memory bandwidth budget, the at least one CU may be encoded in an interpicture mode (620). The method may then continue to search the at least one CU through a fine motion search (622). The fine motion search may identify motion in a CU by accessing memory and comparing the CU to a similar CU from a prior or future image. If a similar CU is identified by the fine motion search, motion compensation may be processed for the CU (624). During motion compensation a motion vector may be assigned and the CU may be linked to the prior or future image through reference data.

If the cost of interpicture encoding is greater than the real-time memory bandwidth budget, the at least one CU may be encoded in an intrapicture mode (626). In this implementation, the memory controller may prevent latency in memory requests by monitoring or controlling memory requests from clients. The memory controller may actively limit fluctuations in the memory bandwidth budget by providing the real-time memory bandwidth budget to a cost estimation module. A prediction mode module may then activate an intrapicture mode to ensure that the real-time memory bandwidth budget is not exceeded.

Once the coding tree mode decision and related processes are completed, coded CUs defining a compressed sequence of images may be compressed further through an entropy encoding operation (e.g. CABAC) (628). The method 602 may continue to process the next CU 630 after completing the entropy encoding. The next CU may also be processed during steps 620-628 by processing each CU as part of a video pipeline. As the encoding process is completed for each CU, a coded bit stream of the original video sequence may be output including the reference data for video playback (634).

The methods, devices, and logic described above may be implemented in many different ways and many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method for encoding video comprising:
   receiving an input video signal comprising a plurality of frames;
   splitting a frame of the plurality of frames into at least a first coding unit and a second coding unit of a plurality of coding units;
   estimating a cost of interpicture coding one or more coding units of the plurality of coding units;
   applying an intrapicture coding method to the first coding unit in response to a first coding tree decision corresponding to the cost exceeding a bandwidth threshold; and
   applying an interpicture coding method to the second coding unit in response to a second coding tree decision corresponding to the cost being less than a bandwidth threshold.

2. The method according to claim 1, wherein the bandwidth threshold is an available DRAM bandwidth.

3. The method according to claim 1, wherein the cost of inter picture encoding the one or more coding units is estimated based on sampling raw reference pixels.

4. The method according to claim 1, further comprising monitoring a latency of a memory request.

5. The method according to claim 4, wherein the bandwidth threshold is calculated from the latency of the memory request.

6. The method according to claim 1, wherein the bandwidth threshold is adjusted based on varying memory busy levels.

7. The method according to claim 1, wherein the cost is estimated based on a partition size of the coding unit.

8. A system for efficient video coding based on available memory bandwidth comprising:
   a memory unit;
   a processor being operably coupled to the memory unit; and
   a memory usage detection circuit in communication with the processor, wherein the processor comprises at least one module configured to:
      partition a frame into a plurality of coding units;
      receive a signal from the memory usage detection circuit, the signal being applied as a factor to calculate an available memory bandwidth; and
      estimate a memory cost of encoding one or more coding units of the plurality of coding units in an interpicture prediction mode; and
      apply an intrapicture prediction mode to a coding unit of the plurality of coding units in response to a memory cost exceeding the available memory bandwidth and the interpicture prediction mode to the coding unit of the plurality of coding units in response to the memory cost being less than the available memory bandwidth.

9. The system according to claim 8, wherein the memory cost of encoding the coding unit of the plurality of coding units in the interpicture prediction mode is determined by sampling raw reference pixels.

10. The system according to claim 8, wherein the memory usage detection circuit comprises a memory monitor, the memory monitor being configured to monitor a latency of a memory request.

11. The system according to claim 10, wherein the available memory bandwidth is calculated from the latency of the memory request.

12. The system according to claim 8, wherein the available memory bandwidth is adjusted based on varying memory busy levels.

13. The system according to claim 8, wherein the memory unit is DRAM.

14. The system according to claim 13, wherein the memory usage circuit comprises a DRAM controller, the DRAM controller being configured to monitor the available memory bandwidth.

15. A method for efficient video coding based on available memory bandwidth comprising:

receiving an input video signal comprising a plurality of frames;

partitioning a frame of the plurality of frames into a plurality of coding units;

sampling raw pixels of a coding unit of the plurality of coding units to determine an interpicture prediction mode cost; and comparing the interpicture prediction mode cost to a DRAM bandwidth budget, wherein an interpicture mode is applied to the coding unit in response to the interpicture prediction mode cost being less than the DRAM bandwidth budget and an intrapicture prediction mode is applied in response to the interpicture prediction mode cost being greater than the DRAM bandwidth budget.

16. The method according to claim 15, wherein the interpicture mode cost is further estimated from a partition size of the coding unit.

17. The method according to claim 15, wherein the interpicture mode cost is determined for a group of consecutive coding units of the plurality of coding units.

18. The method according to claim 15, wherein the interpicture mode cost is optimized by applying a Lagrange multiplier to estimate a maximum interpicture mode cost.

19. The method according to claim 15, wherein the DRAM bandwidth budget is adjusted based on the memory allocated to a plurality of processes.

20. The method according to claim 19, wherein the DRAM bandwidth budget is controlled by a DRAM controller.

* * * * *